United States Patent
Takeda et al.

(10) Patent No.: US 11,218,898 B2
(45) Date of Patent: Jan. 4, 2022

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/760,241

(22) PCT Filed: Nov. 1, 2017

(86) PCT No.: PCT/JP2017/039605
§ 371 (c)(1),
(2) Date: Apr. 29, 2020

(87) PCT Pub. No.: WO2019/087340
PCT Pub. Date: May 9, 2019

(65) Prior Publication Data
US 2021/0211913 A1    Jul. 8, 2021

(51) Int. Cl.
*H04W 24/10* (2009.01)
*H04W 72/04* (2009.01)

(52) U.S. Cl.
CPC ......... *H04W 24/10* (2013.01); *H04W 72/042* (2013.01)

(58) Field of Classification Search
CPC .......................... H04W 24/10; H04W 72/042
See application file for complete search history.

(56) References Cited

U.S. PATENT DOCUMENTS

2017/0135039 A1    5/2017  Takeda et al.
2019/0132109 A1*   5/2019  Zhou ............... H04L 5/0098

OTHER PUBLICATIONS

International Search Report issued in PCT/JP2017/039605 dated Jan. 23, 2018 (1 page).
Written Opinion of the International Searching Authority issued in PCT/JP2017/039605 dated Jan. 23, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 17930400.1, dated Jun. 10, 2021 (8 pages).
Qualcomm Incorporated; "Small cell on/off time reduction"; 3GPP TSG-RAN WG1 #77, R1-141956; Seoul, Korea; May 19-23, 2014 (6 pages).

* cited by examiner

Primary Examiner — Ronald B Abelson
(74) Attorney, Agent, or Firm — Osha Bergman Watanabe & Burton

(57) ABSTRACT

A user terminal according to one aspect of the present disclosure includes: a receiving section that receives downlink control information on a downlink control channel, the downlink control information including information related to activation of a cell and information related to a trigger of channel state measurement; and a control section that controls the activation of the cell based on the information related to the activation, and controls the channel state measurement of the cell based on the information related to the trigger of the channel state measurement. According to the one aspect of the present disclosure, it is possible to control activation at a high speed.

6 Claims, 9 Drawing Sheets

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) have been also studied.

According to Carrier Aggregation (CA) of legacy LTE (e.g., LTE Rel. 13), a base station performs control that uses a Medium Access Control Control Element (MAC Control Element (MAC CE)) to activate a Secondary Cell (SCell) from a deactivated state for a user terminal (UE: User Equipment).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Legacy LTE requires several tens of ms to activate the SCell. A future radio communication system (e.g., NR) is requested to control quicker activation/deactivation of the SCell. Unless a method for appropriately performing this control is established, there is a problem that a throughput lowers.

It is therefore one of objects of the present disclosure to provide a user terminal and a radio communication method that can control activation at a high speed.

Solution to Problem

A user terminal according to one aspect of the present disclosure includes: a receiving section that receives downlink control information on a downlink control channel, the downlink control information including information related to activation of a cell and information related to a trigger of channel state measurement; and a control section that controls the activation of the cell based on the information related to the activation, and controls the channel state measurement of the cell based on the information related to the trigger of the channel state measurement.

Advantageous Effects of Invention

According to one aspect of the present invention, it is possible to control activation at a high speed.

DESCRIPTION OF EMBODIMENTS

Figure 1:
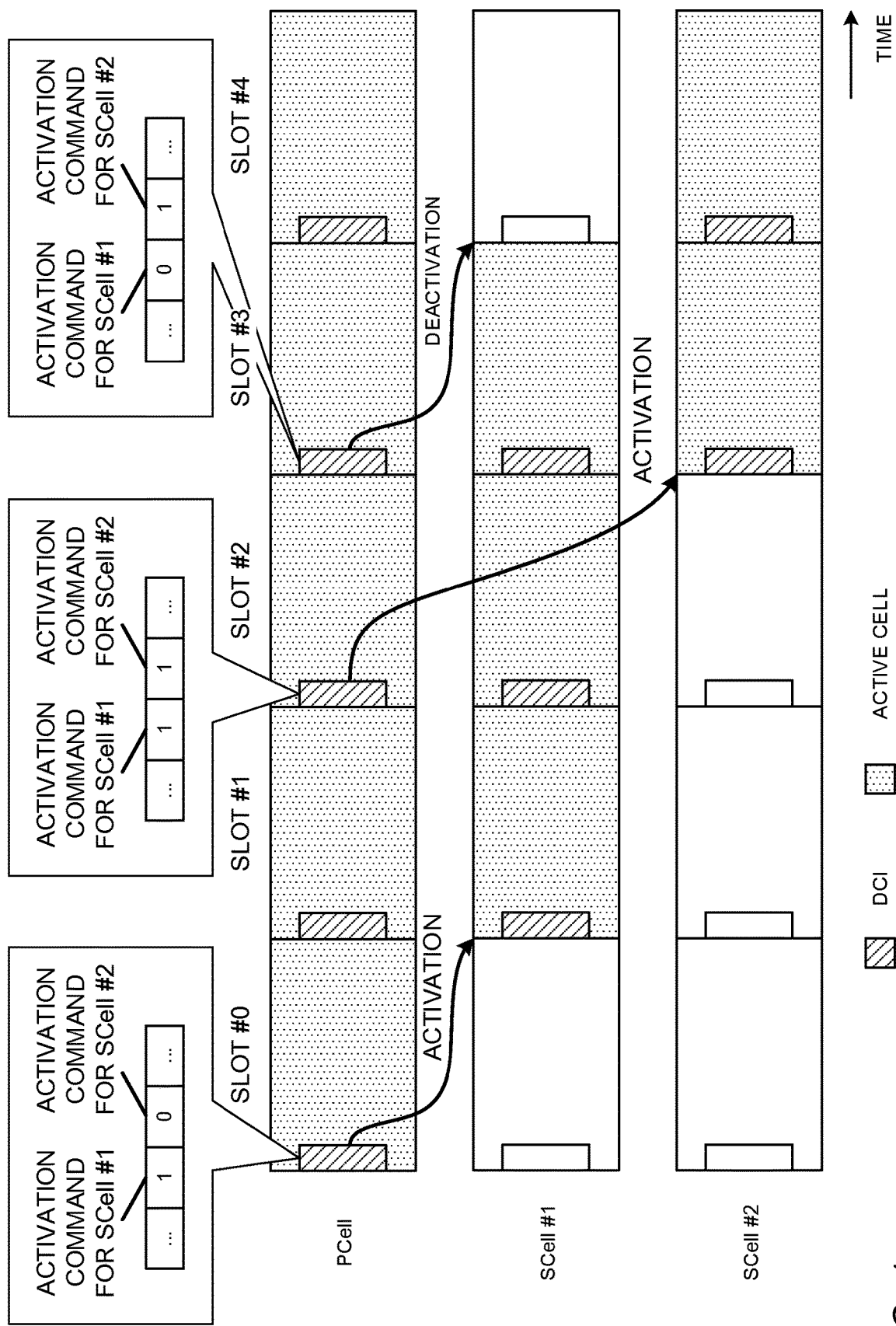
FIG. 1 is a diagram illustrating one example of an operation of a UE that has detected activation DCI.

According to Carrier Aggregation (CA) of legacy LTE (e.g., LTE Rel. 13), a signaling (Activation/Deactivation MAC CE) that uses a Medium Access Control Control Element (MAC Control Element (MAC CE)) is used to activate an SCell from a deactivated state. The MAC CE includes information related to whether or not each SCell needs to be activated.

In this regard, in a deactivated cell, for example, a UE does not monitor a downlink control channel (e.g., Physical Downlink Control Channel (PDCCH)), or does not transmit an uplink control channel (PUCCH: Physical Uplink Control Channel). That is, the UE performs a less operation than an operation in an active cell.

The UE that has received an activation MAC CE in a certain subframe (subframe n) needs to transmit a valid CSI reporting by a subframe n+24 or n+34. In this regard, the valid CSI corresponds to a CQI value other than a CQI index=0 (associated with an Out Of Range (OOR)) obtained based on measurement by the UE.

As is clear from the above, legacy LTE requires several tens of ms to activate the SCell. It is demanded that a future radio communication system (e.g., at least one of NR, 5G and 5G+ that will be referred to simply as NR below) more quickly controls activation/deactivation of SCells. There is a problem that, unless a method for appropriately performing this control is established, a throughput lowers.

Hence, the inventors of this application have conceived a method for controlling activation/deactivation of an SCell at a high speed. More specifically, the inventors of this application have found that activation/deactivation is controlled by a method based on Downlink Control Information (DCI) that is transmitted on a downlink control channel from a base station (that may be referred to as a Base Station (BS), an eNodeB (eNB) or a gNB) unlike a legacy MAC-based method.

An embodiment according to the present disclosure will be described in detail below with reference to the drawings. A radio communication method according to each embodiment may be each applied alone or may be applied in combination.

In the following description, terms (e.g., "activation" and "active") related to an activate state may be read as terms (e.g., "deactivation" and "deactivated") related to a deactivated state.

(Radio Communication Method)
<Configuration of Activation DCI>

According to one embodiment, activation DCI (that may be referred to as activation/deactivation DCI) may include at least one or more following pieces of information (1) to (5):
(1) Activation command,
(2) CSI measurement trigger,
(3) CSI reporting request,
(4) SRS Resource Index (SRI), and
(5) Aperiodic Sounding Reference Signal (A-SRS) transmission trigger.

The activation command is information for controlling activation and/or deactivation. One activation command may be expressed by 1 bit. For example, "1" may indicate activation, and "0" may indicate deactivation (or vice versa).

An activation command may correspond to information for performing control to invert a state of activation/deactivation or maintain the state. For example, "1" may indicate inversion of the state (e.g., a transition from a deactivated state to an active state), and "0" may indicate maintenance of the state (or vice versa).

The CSI measurement trigger may be information that indicates whether or not to perform CSI measurement (that may be referred to as channel state measurement) by using a specific CSI sounding Reference Signal (CSI-RS) configuration. The specific CSI-RS configuration may be, for example, a Semi-Persistent (SP) CSI-RS configuration, or an aperiodic CSI-RS configuration.

In addition, measurement that is indicated by the CSI measurement trigger is not limited to measurement of the CSI-RS. The measurement may be performed by using other reference signals. Information of resources used for measurement indicated by the CSI measurement trigger may be specified by information included in activation DCI, or may be configured in advance by a higher layer signaling.

In this regard, the higher layer signaling may be one of, for example, a Radio Resource Control (RRC) signaling, a Medium Access Control (MAC) signaling (e.g., an MAC CE or an MAC Protocol Data Unit (PDU)), and broadcast information (a Master Information Block (MIB) or a System Information Block (SIB)), or a combination of these.

One CSI measurement trigger may be expressed by 1 bit. For example, "1" may indicate a CSI measurement trigger. However, the CSI measurement trigger is not limited to this.

When the CSI measurement trigger included in the activation DCI triggers CSI measurement of an SCell, the UE may perform the CSI measurement in the SCell even when the SCell is in a deactivated state. This deactivated state and a state where CSI measurement is performed may be referred to as a semi-activate state and a measurement state, respectively.

The CSI reporting request may be information that indicates whether or not to make a CSI reporting (that may be referred to as a channel state reporting), and may be referred to as a CSI reporting trigger. The CSI reporting may be, for example, semi-static CSI reporting, or may be an aperiodic CSI reporting configuration.

When the activation DCI triggers the CSI reporting, the UE may report CSI based on a past CSI measurement result. When the activation DCI triggers both of a CSI reporting and CSI measurement, the UE may report CSI based on the CSI measurement and/or the past CSI measurement result.

One CSI reporting request may be expressed by 1 bit. For example, "1" may indicate the CSI reporting trigger. However, the CSI reporting request is not limited to this.

The CSI reporting may be transmitted by using a PCell (or a cell corresponding to a PCell such as a Primary SCell (PSCell)) or may be transmitted by using an SCell. The activation DCI may include information related to a cell that transmits a CSI reporting. In a case where the CSI reporting is triggered, the activation DCI may include information related to UL resource allocation for transmission of the CSI reporting. When the CSI reporting is not triggered, the information related to UL resource allocation may be configured to indicate a specific value (e.g., 0), or may not be included in the activation DCI.

The information related to UL resource allocation may be simplified by a resource allocation field used for a legacy UL grant (e.g., DCI format 0 or 4). For example, the information related to UL resource allocation may be configured to indicate part of UL resources in a system band. By so doing, it is possible to reduce the number of bits of the activation DCI.

For the CSI reporting triggered by the activation DCI, a fixed Modulation and Coding Scheme (MCS) may be used, or an MCS (e.g., an MCS restricted compared to an MCS that is indicated by a UL grant) that is restricted compared to general UL transmission. A transmission parameter (e.g., MCS) used for the CSI reporting may be specified by information included in the activation DCI, or may be configured in advance by, for example, a higher layer signaling. In addition, the CSI reporting may be transmitted by using a data channel (e.g., PUSCH), or may be transmitted by using a control channel (e.g., PUCCH).

The SRI and/or A-SRS transmission trigger may be used by the base station to cause the UE to transmit SRS. When, for example, a channel between the UE and the base station has reciprocity (when, for example, the UE uses Time Division Duplex (TDD) to communicate with the base station), the base station causes the UE to transmit the SRS, and measures the SRS, so that the base station can dynamically obtain a fluctuation of a channel state.

The activation command may include at least one of features described below.

One activation command may be expressed by 2 or more bits.

The activation DCI may include an activation command for each cell (each SCell).

The activation DCI may include an activation command that is common between one or a plurality of cells (e.g., all SCells).

The activation DCI may include information (e.g., SCell index) for specifying an SCell associated with the activation command.

The total number of bits of the activation command included in the activation DCI may depend on the number of SCells configured to the UE. For example, control may be performed such that, as the number of SCells configured to the UE is larger, the total number of bits of the activation command is larger. Furthermore, the total number of bits may be configured by, for example, a higher layer signaling, and may correspond to, for example, a maximum number (e.g., 8) of cells (or SCells) that is configurable.

In addition, in the above description of the features, the activation command may be read as a CSI measurement trigger, a CSI reporting request, an SRI or an A-SRS transmission trigger. Furthermore, in the above description of the features, a "cell" may be read as a "cell group", and an "SCell" may be read as "a cell other than a cell corresponding to a PSCell included in a cell group".

At least two pieces of information of the activation command, the CSI measurement trigger, the CSI reporting request, the SRI and the A-SRS transmission trigger may be joint-encoded. Information for controlling one of the activation command, the CSI measurement trigger, the CSI reporting request, the SRI and the A-SRS transmission trigger may be read as another information based on a state of activation/deactivation of the SCell. By employing this configuration, it is possible to reduce the number of bits of the activation DCI.

For example, the CSI measurement trigger and the CSI reporting request may be merged. When an SCell related to the merged information (that may be referred to as, for example, a CSI measurement/reporting trigger) is in a deactivated state, that the information is "1" (trigger on) may indicate only start of CSI measurement. When this SCell is in an active state (or when information that indicates activation of the SCell is indicated), that the information is "1" (trigger on) may indicate start of CSI measurement and reporting. In addition, a bit of trigger on is not limited to "1", and the number of bits of the CSI measurement/reporting trigger is not limited to 1, either.

<Activation DCI Specifying Method>

Activation DCI may include the same DCI format as another DCI (e.g., scheduling DCI (e.g., a UL grant or a DL assignment)). In other words, an activation DCI size may be the same as other DCI sizes. When detected DCI is a specific bit sequence or includes specific information (bits), the UE may determine that the DCI is the activation DCI. The specific information may be referred to as information for identifying scheduling DCI and the activation DCI.

The activation DCI may be scrambled by a specific Radio Network Temporary Identifier (RNTI) for the DCI. More specifically, a Cyclic Redundancy Check (CRC) bit for the activation DCI may be scrambled (masked) by a specific RNTI. The specific RNTI may be referred to as, for example, an activation/deactivation RNTI.

When all configured SCells are activated, the UE may not monitor the activation DCI. When a given number of (e.g., one) SCells or more are in a deactivated state, the UE may monitor the activation DCI. The given number may be configured by a higher layer signaling, or may be defined by a specification.

The activation DCI may be transmitted by using a Group Common PDCCH (GC-PDCCH). In this regard, the GC-PDCCH is a PDCCH that is common between one or more UEs, and DCI that is conveyed on the GC-PDCCH may be group common DCI.

The activation DCI may be transmitted by using a common search space, or may be transmitted by using a UE-specific search space.

The activation DCI may be transmitted by using a PCell (or a cell corresponding to a PCell), or may be transmitted by using an SCell. For example, the activation DCI including the activation command is preferably transmitted by using the PCell (or a cell corresponding to the PCell).

After a certain SCell is activated, activation DCI transmitted in the SCell may trigger CSI measurement and/or reporting of the SCell. Even after the certain SCell is activated, activation DCI transmitted in the PCell (or a cell corresponding to the PCell) may trigger CSI measurement and/or reporting of the SCell.

<Operation of UE that has Detected Activation DCI>

When detecting the activation DCI for indicating activation of a certain SCell, the UE may activate the SCell in the same slot as the slot in which this DCI has been detected, or a slot that comes a given duration (offset) after. The UE may assume that the activation is effective until DCI for indicating deactivation is detected, or may assume that the activation is effective only in 1 slot or over a plurality of slots.

When detecting the activation DCI for indicating triggering of CSI measurement in a certain SCell, the UE may perform the CSI measurement of the SCell in the same slot as the slot in which the DCI has been detected, or a slot that comes a given duration (offset) after. The UE may assume to perform the CSI measurement until DCI for indicating triggering off of the CSI measurement is detected, or assume to perform the CSI measurement only in 1 slot or over a plurality of slots.

When the activation DCI for indicating triggering of a CSI reporting of a certain SCell is detected, the UE may make the CSI reporting of the SCell in the same slot as the slot in which this DCI has been detected or a slot that comes a given duration (offset) after. The UE may assume that the CSI reporting is made until DCI for indicating triggering off of the CSI reporting is detected, or may assume to make the CSI reporting only in 1 slot or over a plurality of slots.

Information related to a duration (and/or an offset) during which activation is effective, a duration (and/or an offset) in which CSI measurement is performed by a CSI measurement trigger, and a duration (and/or an offset) in which CSI reporting measurement is performed by a CSI reporting trigger may be specified based on information included in the activation DCI, may be managed by a timer configured in a higher layer, or may be configured in advance by a higher layer signaling.

In addition, the "slot" described herein may be read as other time units, and may be read as, for example, mini slots, subframes or timings. Furthermore, the above-described "given duration" may be, for example, 1 slot, or may be a slot after ACK in response to reception of the activation DCI is transmitted.

FIG. 1 is a diagram illustrating one example of an operation of a UE that has detected activation DCI. In this example, only a PCell is in an activate state at a point of time of a slot #0, and activation DCI including activation commands for SCells #1 and #2 is notified in the PCell. The UE activates/deactivates a target SCell 1 slot after detection of the activation DCI.

When detecting the activation DCI indicating activation of the SCell #1 in the slot #0 of a PCell, the UE activates the SCell #1 in the slot #1, and starts transmission and/or reception processing in the SCell #1.

When detecting the activation DCI indicating activation of the SCells #1 and #2 in a slot #2 of the PCell, the UE activates a still deactivated SCell #2 in a slot #3, and starts transmission and/or reception processing in the SCell #2.

When detecting activation DCI indicating deactivation of the SCell #1 in the slot #3 of the PCell, the UE deactivates the active SCell #1 in a slot #4.

Figure 2:
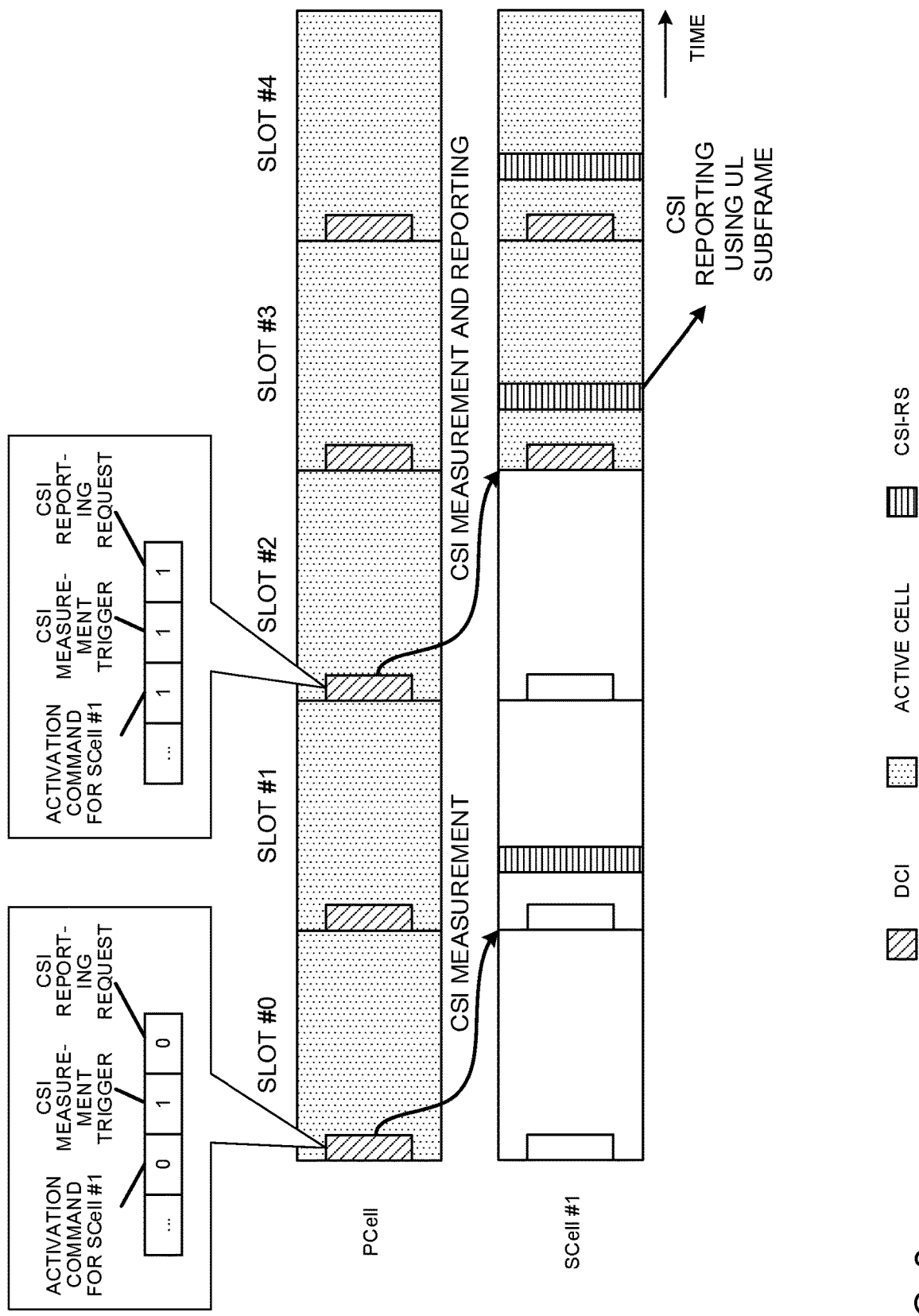
FIG. 2 is a diagram illustrating one example of CSI measurement/reporting of the UE based on the activation DCI.

FIG. 2 is a diagram illustrating one example of CSI measurement/reporting of the UE based on activation DCI. In this example, only the PCell is in an active state at a point of time of the slot #0, and activation DCI including an activation command for the SCell #1, a CSI measurement trigger and a CSI reporting request is notified in the PCell. The UE activates/deactivates a target SCell, and triggers CSI measurement and/or a CSI reporting 1 slot after detection of the activation DCI.

When detecting the activation DCI for triggering the CSI measurement in the SCell #1 in the slot #0 of the PCell, the UE performs the CSI measurement by using a given CSI-RS resource in the slot #1 of the SCell #1. The CSI reporting is not triggered at this point of this, and therefore the UE does not make the CSI reporting.

When detecting activation DCI indicating activation of the SCell #1, a CSI measurement trigger and a CSI reporting trigger in the slot #2 of the PCell, the UE activates the SCell #1 in the slot #3, and starts transmission and/or reception processing in the SCell #1. Furthermore, CSI measurement is performed by using a given CSI-RS resource in the slot #3 of the SCell #1. Furthermore, CSI that has been obtained by the above CSI measurement is reported by using a UL subframe in the slot #3 or a slot subsequent to this slot #3.

Figure 3:
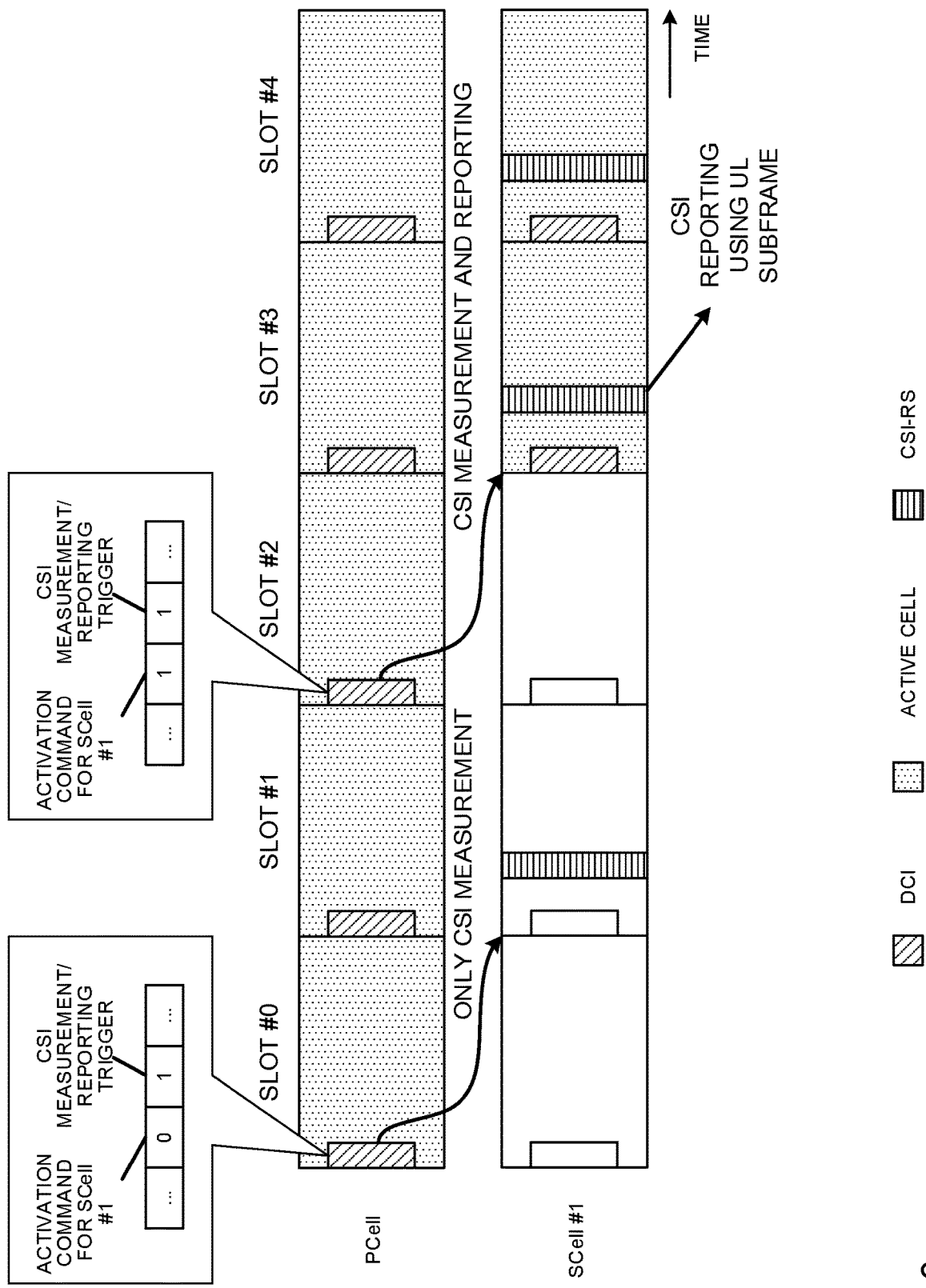
FIG. 3 is a diagram illustrating another example of CSI measurement/reporting of the UE based on the activation DCI.

FIG. 3 is a diagram illustrating another example of CSI measurement/reporting of the UE based on activation DCI. In this example, only the PCell is in an active state at a point of time of the slot #0, and activation DCI including an activation command for the SCell #1 and a CSI measurement/reporting trigger is notified in the PCell. The UE activates/deactivates of a target SCell, and triggers CSI measurement and/or a CSI reporting 1 slot after detection of the activation DCI.

It is assumed that, in a case where the target SCell is in a deactivated state, "1" of the CSI measurement/reporting trigger in this example indicates a trigger of only CSI measurement of the SCell, and, in a case where the SCell is in an active state (or a case where an activation command for activating the SCell is concurrently instructed), "1" indicates the CSI measurement and reporting trigger of the SCell.

The UE detects activation DCI for triggering CSI measurement/reporting of the SCell #1 in the slot #0 of the PCell. In this case, the SCell #1 is still in a deactivated state, and therefore the UE performs CSI measurement by using a given CSI-RS resource in the slot #1 of the SCell #1, and does not make a CSI reporting.

When detecting activation DCI for activating the SCell #1 and triggering CSI measurement/reporting in the slot #2 of the PCell, the UE deactivates the SCell #1 in the slot #3, and starts transmission and/or reception processing in the SCell #1. Furthermore, the UE performs CSI measurement by using a given CSI-RS resource in the slot #3 of the SCell #1. Furthermore, the UE reports CSI that has been obtained by the above CSI measurement by using a UL subframe in the slot #3 or a slot subsequent to this slot #3.

According to the above-described embodiment, it is possible to perform activation, and CSI measurement/reporting at a high speed by using DCI.

Other Modified Example

The above embodiment has described control of activation of a cell, and CSI measurement/reporting. However, the control target is not limited to cells. A "cell", a "PCell" and an "SCell" in the above embodiment may be read as, for example, a "Bandwidth Part (BWP)".

The BWP may be referred to as a partial frequency band or a partial band. According to NR, one or a plurality of BWPs can be configured to the UE per Component Carrier (CC).

(Radio Communication System)

The configuration of the radio communication system according to one embodiment of the present disclosure will be described below. This radio communication system uses one or a combination of the radio communication method according to each of the above embodiment of the present disclosure to perform communication.

Figure 4:
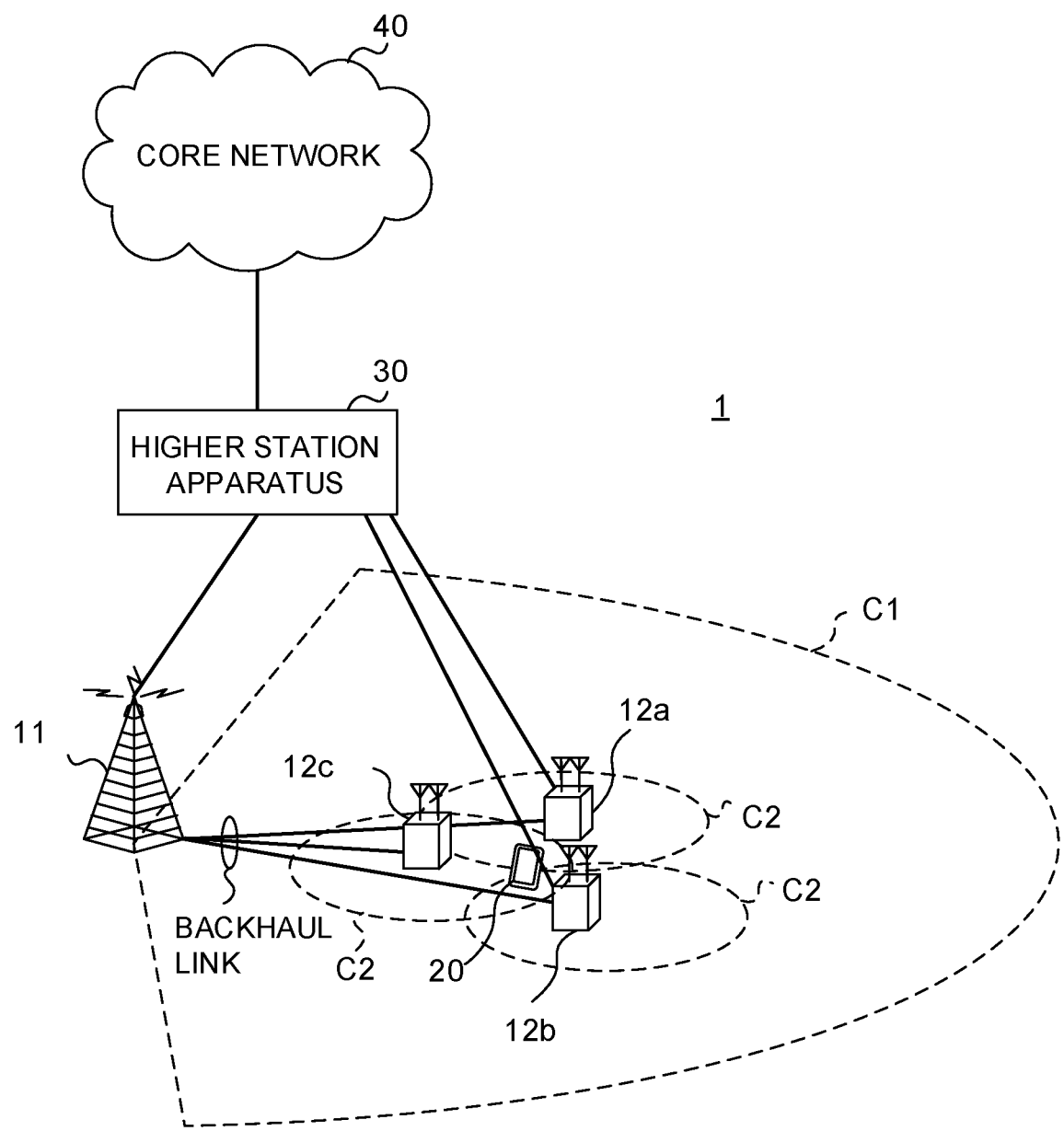
FIG. 4 is a diagram illustrating one example of a schematic configuration of a radio communication system according to one embodiment.

FIG. 4 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 4.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a subcarrier-spacing, a bandwidth, a symbol length, a cyclic prefix length, a subframe length, a TTI length, the number of symbols per TTI, a radio frame configuration, specific filtering processing performed by a transceiver in a frequency-domain, and specific windowing processing performed by the transceiver in a time-domain. For example, a case where subcarrier-spacings of constituent OFDM symbols are different and/or a case where the numbers of OFDM symbols are different on a certain physical channel may be read as that numerologies are different.

The radio base station 11 and each radio base station 12 (or the two radio base stations 12) may be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH. Furthermore, a Master Information Block (MIB) is conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling reception of DL data (e.g., PDSCH) and/or measurement of a DL reference signal may be referred to as a DL assignment, a DL grant or DL DCI. DCI for scheduling transmission of UL data (e.g., PUSCH) and/or transmission of a UL sounding (measurement) signal may be referred to as a UL grant or UL DCI.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 5:
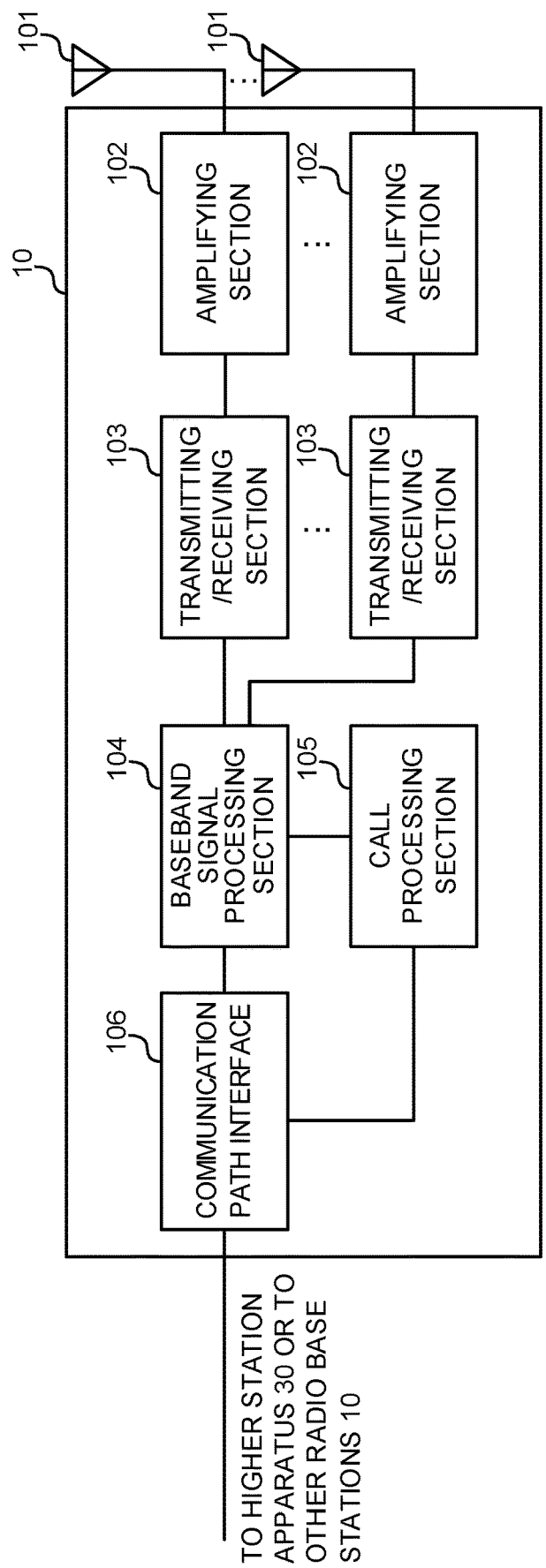
FIG. 5 is a diagram illustrating one example of an overall configuration of a radio base station according to the one embodiment.

FIG. 5 is a diagram illustrating one example of an overall configuration of the radio base station according to the one embodiment. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present disclosure. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as configuration and release) of a communication channel, state management of the radio base station 10 and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmitting/receiving section 103 transmits activation Downlink Control Information (DCI) to the user terminal 20 via a general PDCCH or a GC-PDCCH. The activation DCI may include information such as an activation command, a CSI measurement trigger and a CSI reporting request.

Figure 6:
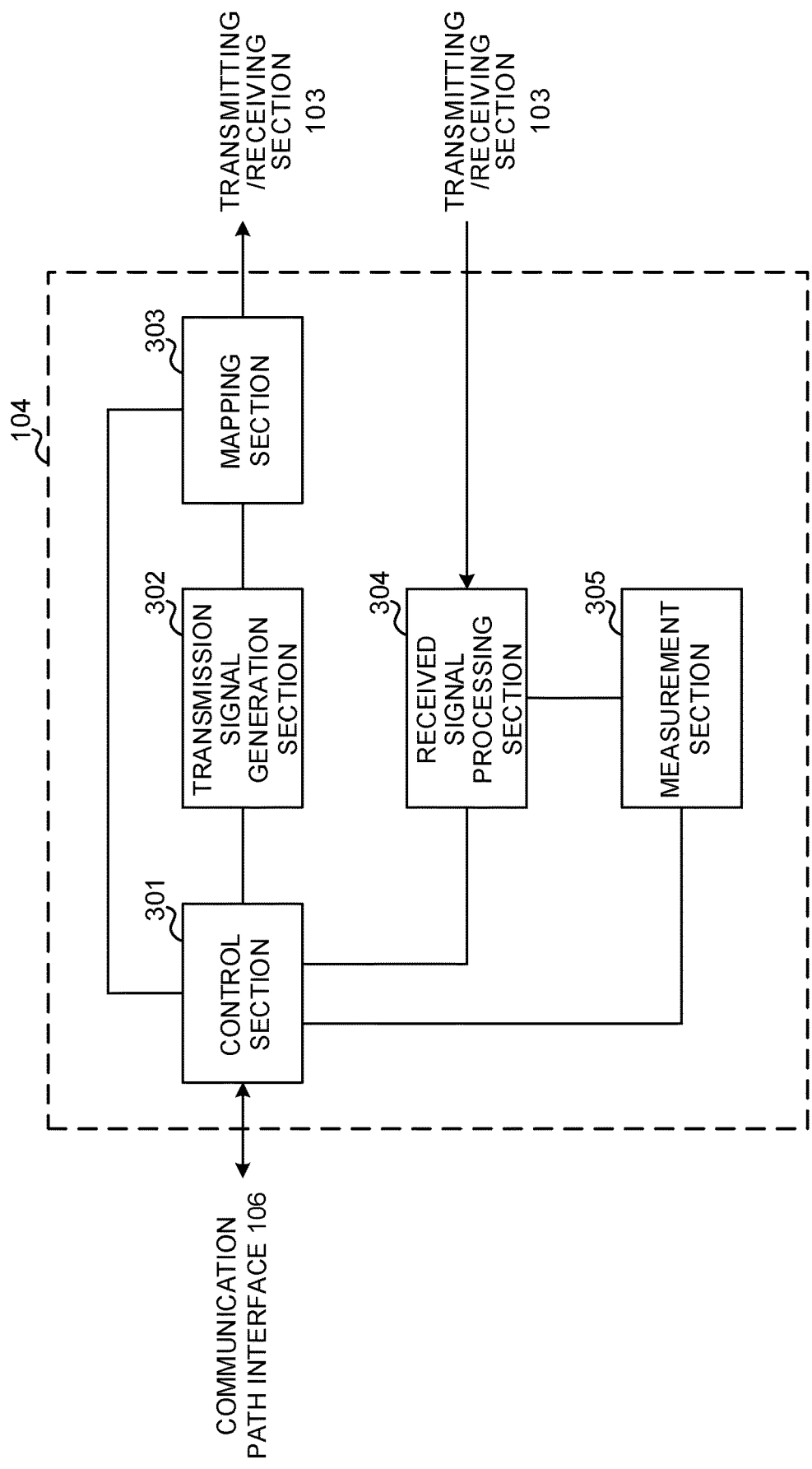
FIG. 6 is a diagram illustrating one example of a function configuration of the radio base station according to the one embodiment.

FIG. 6 is a diagram illustrating one example of a function configuration of the radio base station according to the one embodiment of the present disclosure. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

The control section 301 may perform control to generate downlink control information (activation DCI) for controlling activation of a given frequency resource (e.g., a cell and/or a BWP), CSI measurement and a CSI reporting to transmit to the user terminal 20.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 7:
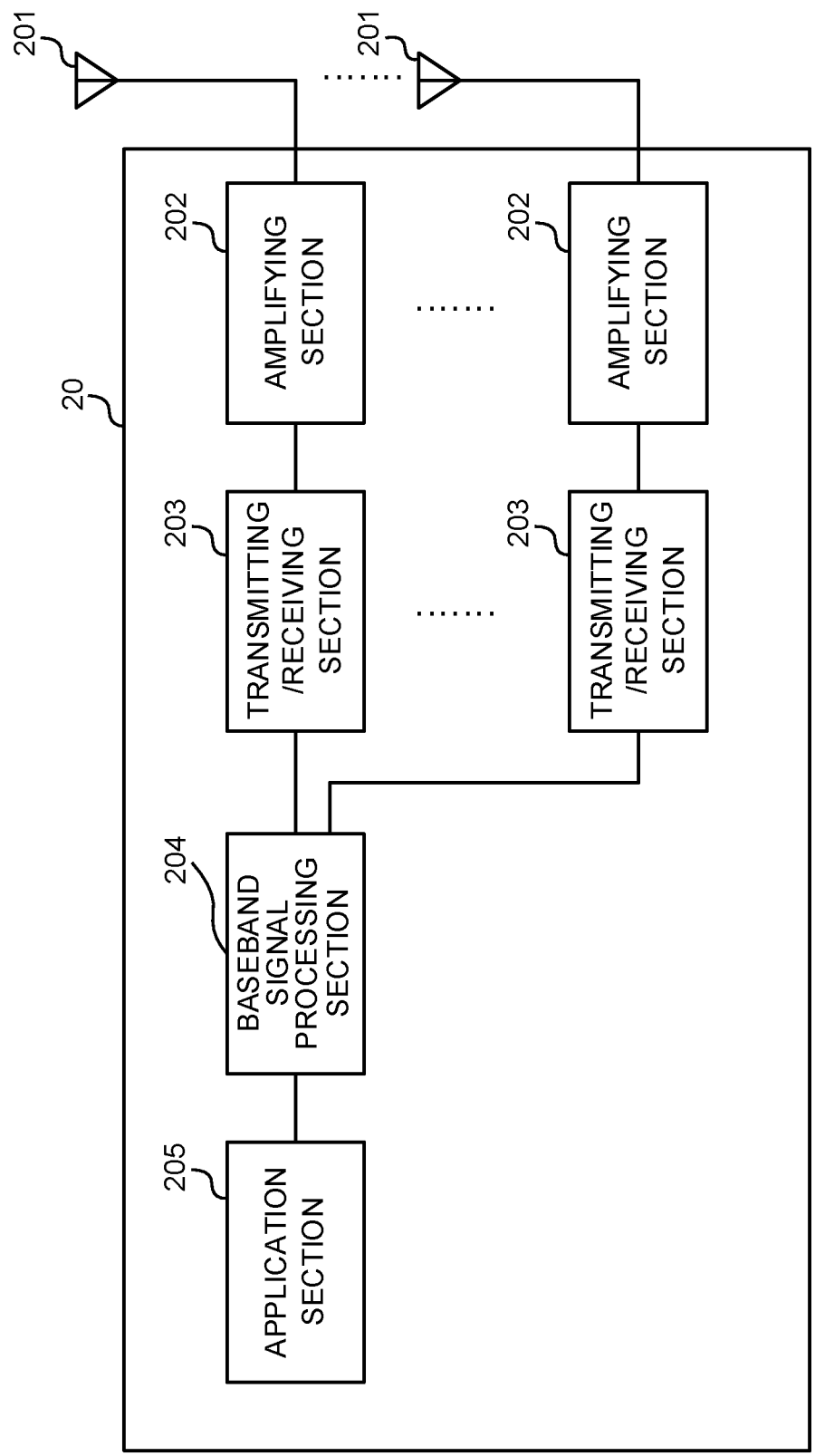
FIG. 7 is a diagram illustrating one example of an overall configuration of a user terminal according to the one embodiment.

FIG. 7 is a diagram illustrating one example of an overall configuration of the user terminal according to the one embodiment. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmission/reception section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present disclosure. In this regard, the transmitting/receiving sections 203 may be composed as an integrated transmitting/receiving section or may be composed of transmitting sections and receiving sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Each transmitting/receiving section 203 receives activation Downlink Control Information (DCI) from the radio base station 10 via a general PDCCH or a GC-PDCCH. The activation DCI may include information such as an activation command, a CSI measurement trigger and a CSI reporting request.

Figure 8:
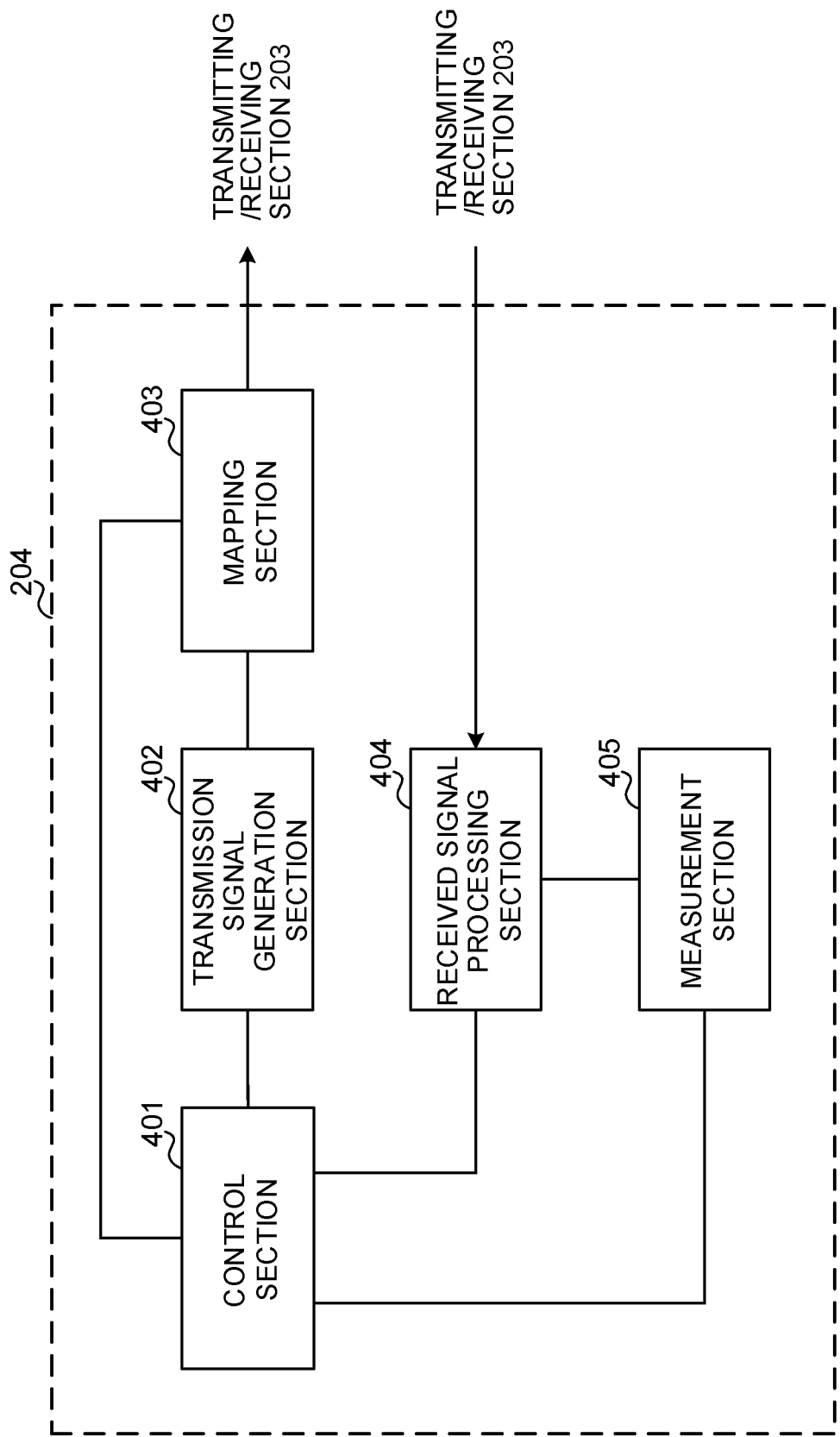
FIG. 8 is a diagram illustrating one example of a function configuration of the user terminal according to the one embodiment.

FIG. 8 is a diagram illustrating one example of a function configuration of the user terminal according to the one embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 obtains downlink control information (activation DCI) from the received signal processing section 404. Based on information (activation command) that is information included in the activation DCI and relates to activation of a given frequency resource (e.g., a cell and/or a BWP), the control section 401 may control activation and/or deactivation of the given frequency resource.

Based on information (CSI measurement trigger) that is information included in the activation DCI and relates to a trigger for channel state measurement of the given frequency resource (e.g., the cell and/or the BWP), the control section 401 may control the channel state measurement (CSI measurement) of the given frequency resource.

Based on information (CSI reporting request) that is information included in the activation DCI and relates to a trigger for a channel state reporting of the given frequency resource (e.g., a cell and/or a BWP), the control section 401 may control the channel state reporting (CSI reporting) of the given frequency resource.

When triggering the CSI measurement of the given frequency resource based on the CSI measurement trigger included in the activation DCI, even if the given frequency resource is in a deactivated state, the control section 401 may perform control to perform the CSI measurement of the given frequency resource.

The control section 401 may determine whether a given bit sequence (e.g., CSI measurement/reporting trigger) included in the activation DCI is associated with one or both of the CSI measurement trigger and the CSI reporting trigger, based on an active state of the frequency resource controlled by the given bit sequence. The control section 401 may change an interpretation of a field of the CSI measurement/reporting trigger included in the DCI according to whether or not a target frequency resource (e.g., a cell and/or a BWP) is active.

Furthermore, when obtaining from the received signal processing section 404 various pieces of information notified from the radio base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the receiving section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 9:
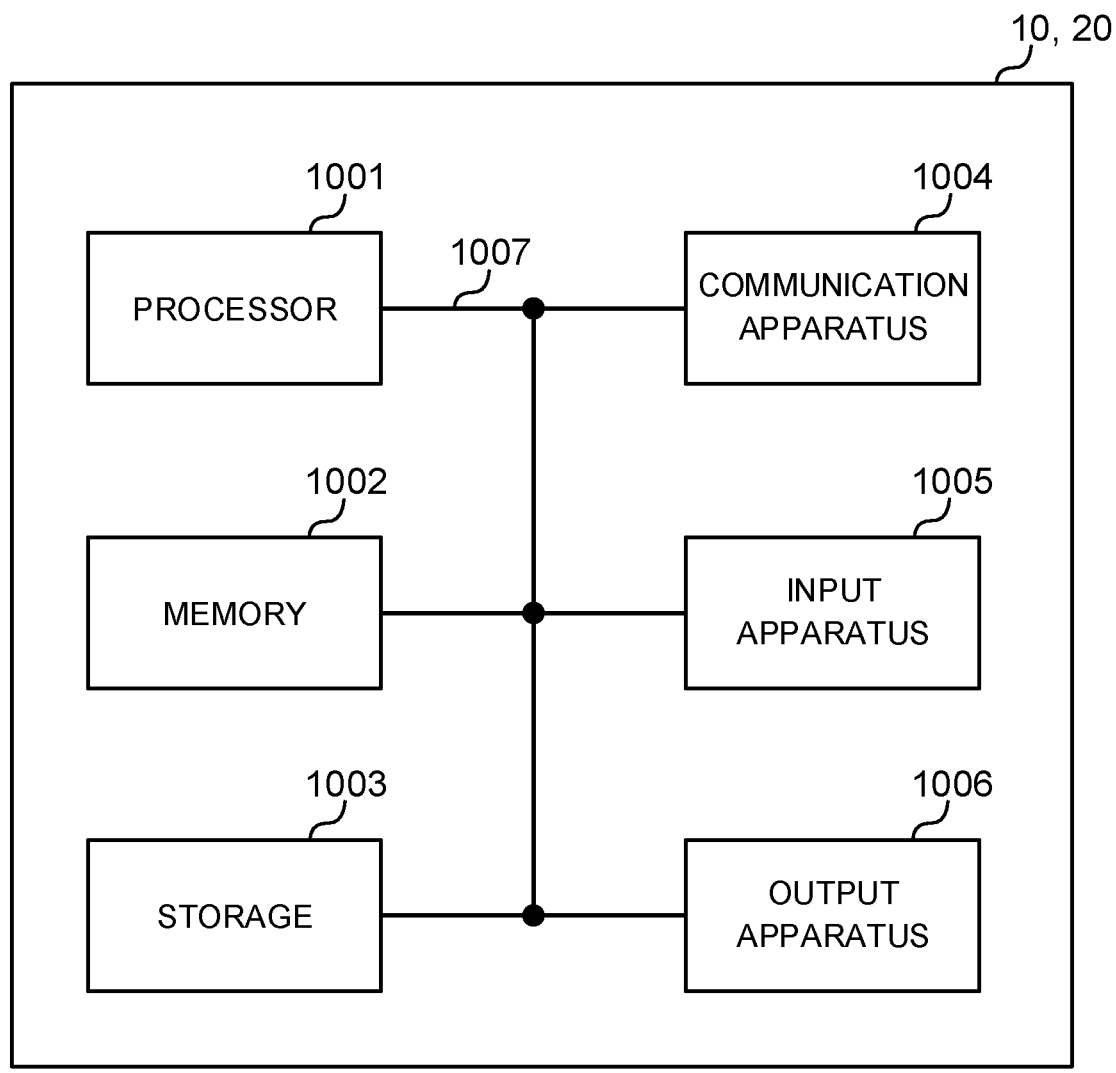
FIG. 9 is a diagram illustrating one example of hardware configurations of the radio base station and the user terminal according to the one embodiment.

For example, the radio base station and the user terminal according to the one embodiment of the present disclosure may function as computers that perform processing of the radio communication method according to the present disclosure. FIG. 9 is a diagram illustrating one example of the hardware configurations of the radio base station and the user terminal according to the one embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

MODIFIED EXAMPLE

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information). Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present disclosure may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
   a receiver that receives downlink control information (DCI) including a specific field corresponding to one or more secondary cell groups, transmitted in a primary cell; and
   a processor that controls stopping of physical downlink control channel (PDCCH) monitoring and performing of channel state information (CSI) measurement in each of the secondary cell groups, based on the specific field.
2. The terminal according to claim 1, wherein a format of the DCI is a DCI format for scheduling a physical uplink shared channel or a DCI format for scheduling a physical downlink shared channel.
3. The terminal according to claim 1, wherein the receiver receives the DCI for secondary cell activation and the processor controls at least one of activation and deactivation of a secondary cell based on the DCI for secondary cell activation.
4. The terminal according to claim 1, wherein the specific field is a field for indicating stopping of the PDCCH monitoring and performing of the CSI measurement in each of the secondary cell groups.
5. A radio communication method for a terminal, comprising:
   receiving downlink control information (DCI) including a specific field corresponding to one or more secondary cell groups, transmitted in a primary cell; and
   controlling stopping of physical downlink control channel (PDCCH) monitoring and performing of channel state information (CSI) measurement in each of the secondary cell groups, based on the specific field.
6. A system comprising a base station and a terminal, wherein
   the base station comprises:
      a transmitter that transmits downlink control information (DCI) including a specific field corresponding to one or more secondary cell groups, transmitted in a primary cell;
   the terminal comprises:
      a receiver that receives the DCI; and
      a processor that controls stopping of physical downlink control channel (PDCCH) monitoring and performing of channel state information (CSI) measurement in each of the secondary cell groups, based on the specific field.

* * * * *